3,128,301
ALKYL ESTERS OF ACYLATED 3,5-DIAMINO-2,4,6-TRIIODOBENZOIC ACIDS AND THEIR PREPARATION
Aubrey A. Larsen, Schodack Center, and James O. Hoppe, Albany, N.Y., assignors to Sterling Drug Inc., New York, N.Y., a corporation of Delaware
No Drawing. Filed Dec. 17, 1953, Ser. No. 398,885
7 Claims. (Cl. 260—471)

This invention relates to new and useful alkyl esters of acylated 3,5-diaminopolyiodobenzoic acids and to their preparation. The invention relates particularly to compounds having the formula

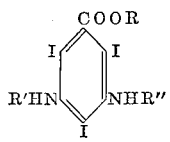

wherein R is a lower-alkyl group, and R' and R'' are lower-alkanoyl groups.

Our new compounds are useful as X-ray contrast agents and are particularly valuable for visualizing the bronchial tree (bronchography). These compounds can be introduced into the lungs either as a finely divided dust or in an aqueous suspension prepared by the aid of emulsifying agents such as carboxymethyl-cellulose, polyvinylpyrrolidone, dextran and the like, for the purpose of delineating the morphology of the bronchial tree.

In the above general formula the alkyl group R is one having from 1 to about 6 carbon atoms, and thus includes such groups as methyl, ethyl, propyl, isopropyl, butyl, isobutyl, tertiary-butyl, amyl, secondary-amyl, hexyl, and isohexyl. The lower-alkanoyl groups, R' and R'', are acyl radicals derived from lower fatty acids having from 1 to about 6 carbon atoms; thus, lower-alkanoyl includes such groups as formyl, acetyl, propionyl, butyryl, isobutyryl, valeryl, isovaleryl, capropyl and isocapropyl.

When the lower-alkanoyl groups R' and R'' are identical the compounds of the invention can be prepared by the following scheme:

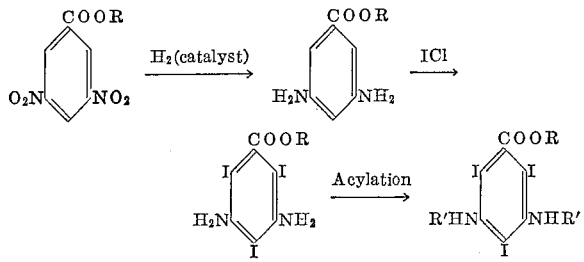

A lower-alkyl ester of 3,5-dinitrobenzoic acid [cf. Malone and Reid, J. Am. Chem. Soc. 51, 3426 (1929)] is hydrogenated in the presence of a catalyst, such as platinum oxide, to give a lower-alkyl ester of 3,5-diaminobenzoic acid. The latter is then exhaustively iodinated by the action of iodine monochloride in acid solution to give a lower-alkyl ester of 3,5-diamino-2,4,6-triiodobenzoic acid which is in turn acylated to give the desired lower-alkyl ester of a 3,5-diacylamino-2,4,6-triiodobenzoic acid. The acylation is carried out by heating the lower-alkyl 3,5-diamino-2,4,6-triiodobenzoate with a lower-alkanoic acid, lower-alkanoic acid anhydride or a lower-alkanoic acid halide. When the formyl derivative (R'=HCO) is desired it is obtained by heating the free diamino acid with formic acid. When acyl derivatives derived from alkanoic acids higher than formic acid are desired it is preferable to use either the acid anhydride or acid halide as the acylating agent as these are more efficient than the free acid. The acylation reaction is promoted by the addition of a trace of a strong acid, such as sulfuric acid, perchloric acid or an organic sulfonic acid as a catalyst, although the reaction will still take place but more slowly in the absence of the catalyst.

The compounds of the invention wherein the lower-alkanoyl groups R' and R'' are different can be prepared by the following scheme:

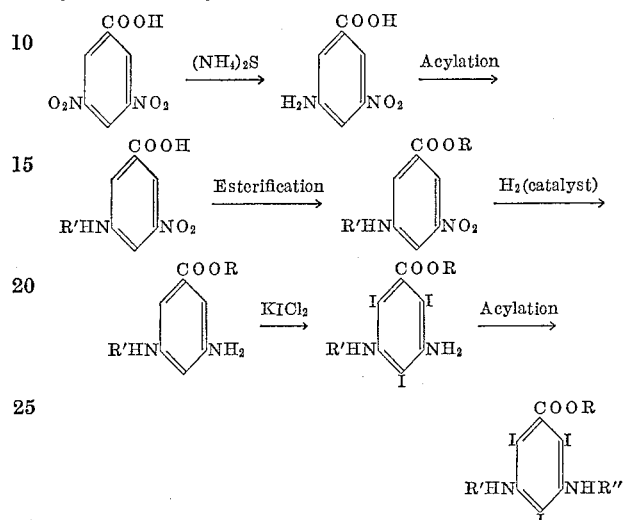

3,5-dinitrobenzoic acid is selectively reduced, using, for example, ammonium sulfide, to give 3-nitro-5-aminobenzoic acid. The latter is then acylated as described above to give a 3-nitro-5-acylaminobenzoic acid which is then esterified by treatment with a diazoalkane or by heating with a lower-alkanol in the presence of a trace of mineral acid. The resulting lower-alkyl 3-nitro-5-acylaminobenzoate is then catalytically hydrogenated to give a lower-alkyl 3-amino-5-acylaminobenzoate. The latter is then exhaustively iodinated, conveniently by heating with a solution of potassium iododichloride ($KICl_2$) to give a lower-alkyl 3-amino-5-acylamino - 2,4,6 - triiodobenzoate which can then be acylated with any desired acylating agent to give a compound of the invention wherein the lower-alkanoyl radical R'' may be different from the lower-alkanoyl radical R'.

The following examples will illustrate our invention more fully.

*Example 1*

(a) *Ethyl 3,5-diaminobenzoate.*—Ethyl 3,5-dinitrobenzoate (24 g.) and about 1 g. of platinum oxide catalyst in 150 ml. of glacial acetic acid were shaken in an atmosphere of hydrogen until the amount of hydrogen necessary to reduce both nitro groups had been absorbed. There was then added 375 ml. of 6 N hydrochloric acid and the mixture was warmed to dissolve the organic material. The platinum oxide was removed by filtration giving a filtrate containing ethyl 3,5-diaminobenzoate as the dihydrochloride salt.

(b) *Ethyl 3,5-diamino-2,4,6-triiodobenzoate.*—To the filtrate of ethyl 3,5-diaminobenzoate dihydrochloride obtained above in part (a) was added a mixture of 16.7 ml. (53.4 g.) of iodine monochloride and 125 ml. of 6 N hydrochloric acid with efficient stirring. After stirring for about one hour the iodination mixture was poured into about 4 liters of ice water, and the solid product was collected by filtration and washed with water, giving 73 g. of ethyl 3,5-diamino-2,4,6-triiodobenzoate.

(c) *Ethyl 3,5 - diacetamido-2,4,6-triiodobenzoate.*—A suspension of 25 g. of ethyl 3,5-diamino-2,4,6-triiodobenzoate in 50 ml. of acetic anhydride containing two drops of concentrated sulfuric acid was stirred for a few minutes. When the initial vigorous reaction had ceased, the mixture was cooled and the solid product was collected by filtration and washed with petroleum ether (Skellysolve B). The product was then heated with ethanol, again filtered and dried, and recrystallized from dimethylformamide using charcoal for decolorizing purposes. After drying the product at 50° C. for three hours and then at 70° C. for about fifteen hours there was obtained about 20 g. of ethyl 3,5-diacetamido-2,4,6-triiodobenzoate as colorless crystals, M.P. 280–290° C. (dec.).

*Analysis.*—Calcd. for $C_{13}H_{13}I_3N_2O_4$: I, 59.32; C, 24.32; N, 2.05. Found: I, 58.9; C, 25.00; H, 2.42.

*Example 2*

(a) *Propyl 3,5-diamino-2,4,6-triiodobenzoate* was prepared by hydrogenation and iodination of 25.4 g. of propyl 3,5-dinitrobenzoate according to the manipulative procedure described above in Example 1, parts (a) and (b). There was thus obtained about 50 g. of propyl 3,5-diamino-2,4,6-triiodobenzoate, M.P. 113–115° C. (dec.).

(b) *Propyl 3,5-diacetamido-2,4,6-triiodobenzoate.*—A suspension of 50 g. of propyl 3,5-diamino-2,4,6-triiodobenzoate in 100 ml. of acetic anhydride was stirred and seven drops of concentrated sulfuric acid was added. When the vigorous initial reaction had subsided the mixture was heated on a steam bath for about ten minutes, then cooled, and the product collected by filtration and washed with petroleum ether (Skellysolve B). The product was heated with 150 ml. of ethanol and again collected giving 54 g., M.P. 255–256° C. (dec.). The compound was then recrystallized by dissolving it in hot dimethylformamide, decolorizing with charcoal and diluting with water while hot. There was thus obtained, after drying at 70° C. for eighteen hours, 41 g. of propyl 3,5-diacetamido-2,4,6-triiodobenzoate, M.P. about 275° C. (dec.).

*Analysis.*—Calcd. for $C_{14}H_{15}I_3N_2O_4$: C, 25.64; H, 2.31; N, 4.27. Found: C, 25.80; H, 2.45; N, 4.36.

*Example 3*

(a) *Methyl 3,5-diamino-2,4,6-triiodobenzoate* was prepared by hydrogenation and iodination of 22.6 g. of methyl 3,5-dinitrobenzoate according to the manipulative procedure described above in Example 1, parts (a) and (b). There was thus obtained about 35 g. of methyl 3,5-diamino-2,4,6-triiodobenzoate, M.P. 129–137° C.

(b) *Methyl 3,5 - diacetamido-2,4,6-triiodobenzoate.*—The methyl 3,5-diamino-2,4,6-triiodobenzoate obtained in part (a) above was acetylated with acetic anhydride according to the method described above in Example 2, part (b). The white crystalline product had a M.P. above 300° C. (dec.).

*Analysis.*—Calcd. for $C_{12}H_{11}I_3N_2O_4$: C, 22.95; H, 1.80; N, 4.46. Found: C, 23.30; H, 1.68; N. 4.42.

The methyl, ethyl and propyl esters of 3,5-diacetamido-2,4,6-triiodobenzoic acid have been introduced as finely divided dusts into the lungs of cats, giving excellent morphological demonstration in X-ray photographs without evidence of toxicity.

*Example 4*

(a) *Isopropyl 3,5-diaminobenzoate dihydrochloride.*—Isopropyl 3,5-dinitrobenzoate (25.4 g.) in 150 ml. of ethanol was hydrogenated in the presence of platinum oxide catalyst. In two hours the calculated amount of hydrogen had been taken up. The catalyst was removed by filtration and hydrogen chloride gas was bubbled through the filtrate for about fifteen minutes. The solution was cooled, an equal volume of ether was added and the resulting yellow precipitate was collected by filtration, washed with ether and dried, giving 20.3 g. of isopropyl 3,5-diaminobenzoate dihydrochloride, M.P. above 300° C.

(b) *Isopropyl 3,5-diamino-2,4,6-triiodobenzoate* was prepared by iodination of isopropyl 3,5-diaminobenzoate dihydrochloride with iodine monochloride by the manipulative procedure described above in Example 1, part (b). There was thus obtained 64.8 g. of isopropyl 3,5-diamino-2,4,6-triiodobenzoate.

(c) *Isopropyl 3,5 - diacetamido-2,4,6-triiodobenzoate* was prepared by acetylation of 64.8 g. of isopropyl 3,5-diamino-2,4,6-triiodobenzoate according to the manipulative procedure described above in Example 2, part (b). There was thus obtained 43.0 g. of isopropyl 3,5-diacetamido-2,4,6-triiodobenzoate, M.P. above 300° C. (dec.).

*Example 5*

(a) *Butyl 3,5-diaminobenzoate dihydrochloride* was prepared by hydrogenation of 67 g. of butyl 3,5-dinitrobenzoate according to the manipulative procedure described above in Example 4, part (a). There was thus obtained 58.1 g. of butyl 3,5-diaminobenzoate dihydrochloride, M.P. 259–260° C.

(b) *Butyl 3,5-diacetamido-2,4,6-triiodobenzoate* was prepared by iodination and acetylation of 13.9 g. of butyl 3,5-diaminobenzoate dihydrochloride by the manipulative procedures described above in Example 1, part (b) and Example 2, part (b). There was thus obtained 6.2 g. of butyl 3,5-diacetamido-2,4,6-triiodobenzoate, M.P. 281–282° C. (dec.).

*Example 6*

Ethyl 3,5-diformamido-2,4,6-triiodobenzoate can be prepared by heating ethyl 3,5-diamino-2,4,6-triiodobenzoate, prepared as described above in Example 1, part (b), with formic acid.

*Example 7*

Ethyl 3,5-dipropionamido-2,4,6-triiodobenzoate can be prepared by heating ethyl 3,5-diamino-2,4,6-triiodobenzoate, prepared as described above in Example 1, part (b), with propionic anhydride or propionyl chloride.

*Example 8*

Ethyl 3,5-butyramido-2,4,6-triiodobenzoate can be prepared by heating ethyl 3,5-diamino-2,4,6-triiodobenzoate, prepared as described above in Example 1, part (b), with butyric anhydride or butyryl chloride.

*Example 9*

(a) *5-amino-3-nitrobenzoic acid.*—A mixture of 212 g. (1 mole) of 3,5-dinitrobenzoic acid, 1.4 liters of water and 210 ml. of concentrated ammonium hydroxide was heated to 70° C. A stream of hydrogen sulfide was passed through the mixture at such a rate that the temperature was maintained at 75–80° C. About fifty minutes after the addition of hydrogen sulfide was begun, the mixture was diluted with 800 ml. of hot water and acidified with 500 ml. of concentrated hydrochloric acid. After cooling, the yellow sulfur cake was removed by filtration, and the filtrate was treated with solid sodium carbonate to the point of maximum precipitation, about pH 3–5, and the orange-yellow product was collected by filtration. After recrystallization from 3–3.5 liters of water, about 160 g. of 5-amino-3-nitrobenzoic acid, M.P. 211–213° C., was obtained.

(b) *5-acetamido-3-nitrobenzoic acid.*—5-amino-3-nitrobenzoic acid (70 g., 0.385 mole) was dissolved in 750 ml. of water containing an equivalent amount of sodium hydroxide, the solution was heated to 40° C., and 43 ml. of acetic anhydride was added with vigorous stirring. After about one hour the yellow solid which had formed was collected by filtration, washed with water and dried, giving 80 g. of 5-acetamido-3-nitrobenzoic acid, M.P. above 270° C.

(c) *5-acetamido-3-aminobenzoic acid.*—A solution of 112 g. (0.5 mole) of 5-acetamido-3-nitrobenzoic acid in 100 ml. of concentrated ammonium hydroxide and 900 ml. of water was hydrogenated under elevated pressure in the presence of Raney nickel catalyst. After about two hours the calculated amount of hydrogen had been taken up, the solution was filtered, and the filtrate acidified with 60 ml. of acetic acid and cooled at 0° C. for about fifteen hours. The resulting white solid was collected by filtration, washed with water and dried, giving 75 g. of 5-acetamido-3-aminobenzoic acid, M.P. 223–225° C.

(d) *Ethyl 3-amino-5-acetamidobenzoate* can be prepared by heating 3-amino-5-acetamidobenzoic acid with ethanol in the presence of a small amount of sulfuric acid in excess of that necessary to neutralize the amino group, and neutralizing and isolating the product.

(e) *Ethyl 3-amino-5-acetamido-2,4,6-triiodobenzoate* can be prepared by heating ethyl 3-amino-5-acetamidobenzoate with a solution of potassium iododichloride.

(f) *Ethyl 3-formamido-5-acetamido-2,4,6-triiodobenzoate* can be prepared by heating ethyl 3-amino-5-acetamido-2,4,6-triiodobenzoate with formic acid.

*Example 10*

*Ethyl 3-propionamido-5-acetamido-2,4,6-triiodobenzoate* can be prepared by heating ethyl 3-amino-5-acetamido-2,4,6-triiodobenzoate, prepared as described above in Example 9, with propionic anhydride.

We claim:
1. A compound having the formula

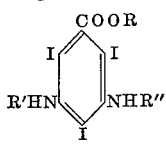

wherein R is a lower-alkyl group, and R' and R" are lower-alkanoyl groups.

2. A compound having the formula

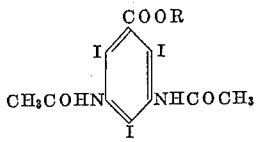

wherein R is a lower-alkyl group.

3. Ethyl 3,5-diacetamido-2,4,6-triiodobenzoate.
4. Propyl 3,5-diacetamido-2,4,6-triiodobenzoate.
5. Methyl 3,5-diacetamido-2,4,6-triiodobenzoate.
6. Isopropyl 3,5-diacetamido-2,4,6-triiodobenzoate.
7. Butyl 3,5-diacetamido-2,4,6-triiodobenzoate.

References Cited in the file of this patent
UNITED STATES PATENTS
2,611,786    Wallingford _____ Sept. 23, 1952

OTHER REFERENCES

Lutjens, Beilstein, 14, 455 (1931); Ber., 29, 2835 (1896).